(12) United States Patent
Priepke

(10) Patent No.: US 7,021,038 B2
(45) Date of Patent: Apr. 4, 2006

(54) CONDITIONER ROLLS

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/702,900

(22) Filed: Nov. 6, 2003

(65) Prior Publication Data

US 2005/0097874 A1 May 12, 2005

(51) Int. Cl.
*A01D 61/00* (2006.01)

(52) U.S. Cl. .................... 56/16.4 C; 56/14.3
(58) Field of Classification Search .............. 56/1, 56/16.4 B, 16.4 C, 14.3
See application file for complete search history.

(56) References Cited

U.S. PATENT DOCUMENTS

| | | | |
|---|---|---|---|
| 1,958,910 A | 5/1934 | Christiansen | 56/1 |
| 2,464,974 A | 3/1949 | Garvey | 130/5 |
| 2,921,426 A | 1/1960 | Heth | 56/1 |
| 3,043,073 A | 7/1962 | Bornzin | 56/1 |
| 3,115,737 A * | 12/1963 | Harrer et al. | 56/1 |
| 3,401,507 A * | 9/1968 | Yetter | 56/1 |
| 3,488,929 A | 1/1970 | Hale | 56/1 |
| 3,513,645 A | 5/1970 | Garrett et al. | 56/1 |
| 3,712,034 A | 1/1973 | Praca | 56/1 |
| 4,035,991 A | 7/1977 | Oosterling et al. | 56/1 |
| 4,075,822 A * | 2/1978 | Heckley et al. | 56/16.4 C |
| 4,216,641 A | 8/1980 | Koch et al. | 56/14.4 |
| 4,321,782 A * | 3/1982 | Zweegers | 56/1 |
| 4,516,392 A | 5/1985 | McLean et al. | 56/16.4 |
| 4,821,494 A * | 4/1989 | O'Halloran et al. | 56/16.4 C |
| 4,860,528 A | 8/1989 | Seymour | 56/16.4 |
| 4,903,463 A | 2/1990 | Linde et al. | 56/1 |
| 4,922,692 A * | 5/1990 | Linde et al. | 56/16.4 C |
| 5,778,647 A | 7/1998 | McLean et al. | 56/13.6 |
| 5,950,409 A * | 9/1999 | Davies | 56/249 |
| 6,050,070 A | 4/2000 | Cook | 56/14.1 |
| 6,073,431 A | 6/2000 | Osborne et al. | 56/15.7 |
| 6,360,515 B1 | 3/2002 | Cook | 56/14.1 |
| 6,499,283 B1 | 12/2002 | Cook | 56/16.4 B |

\* cited by examiner

*Primary Examiner*—Meredith Petravick
(74) *Attorney, Agent, or Firm*—John William Stader; Stephen A. Bucchianeri

(57) ABSTRACT

A pair of conditioning rolls is disclosed that comprise one steel and one rubber/urethane roll. The steel roll has raised ribs formed thereon or attached thereto in a spiral configuration, while the rubber/urethane roll contains grooves therein that intermesh with the raised ribs during operation to grip the crop material. The smooth areas of the rolls crush the crop stems. Alternative embodiments of the grooves provide the ability to work within a wide range of crops, including crops that have heretofore proven difficult to condition.

10 Claims, 4 Drawing Sheets

CONDITIONER ROLLS

CROSS REFERENCE TO RELATED PATENT APPLICATIONS

This application claims priority to U.S. Provisional Patent Application No. 60/468,814, filed on May 8, 2003.

BACKGROUND OF THE INVENTION

The present invention relates generally to crop harvesting machines, commonly referred to as mower-conditioners or windrowers and, more particularly, to conditioning rolls for use in such machines.

Mower-conditioners are well known in the agricultural industry, and may be found in various configurations and designs—the common functions including the severing of standing crop material from the ground, the feeding of cut crop material into a conditioner, and the depositing of the conditioned crop material onto the ground for drying. See, for example, pull-type (generally shown in U.S. Pat. No. 4,035,991), pivot tongue (generally shown in U.S. Pat. No. 5,778,647), and self-propelled (generally shown in U.S. Pat. No. 6,073,431). For purposes of providing a description of exemplary conditioner frames, torsion bars and other structure, the three patents mentioned in the immediately preceding sentence are incorporated in full herein by reference. The conditioning operation consists of passing the cut crop material between a pair of parallel co-acting rolls to break open the hard outer shell of the stems of the stalks to facilitate the escape of moisture from the interior of the stems. This enables the stems to dry, or cure, to the desired moisture content for further harvesting operations in substantially the same length of time as the leaves, thereby decreasing the harvesting time as well as yielding a more uniformly cured and more valuable harvested crop.

In the conditioning operation, the cut crop stalks normally pass between the conditioning rolls with the stems generally perpendicular to the axes of the rolls. One type of conditioning operation, known as crimping, employs a pair of rolls having narrow longitudinally extending radially fins. The two rolls are mounted on a frame such that the fins of the two rolls intermesh without touching. In passing between the intermeshing fins, the stem of the stalk is cracked open transversely at regular intervals along its length. Crimper rolls are characterized by their aggressive feeding and stem cracking action; however, they are rough and vibrant in operation and attack the stems only at spaced intervals, leaving pockets of trapped moisture between successive transverse cracks.

Another type of conditioning operation generally referred to as crushing, employs a pair of relatively smooth rolls which co-act to crush the stems of stalks passing therebetween. In passing between the crushing rolls, the stem of a stalk is cracked open longitudinally along its full length, leaving no pockets of trapped moisture; however, neither the feeding action nor the stem cracking action of the crushing rolls is normally as aggressive as that of the crimper. Hence, a crusher is more apt than a crimper to become plugged. Many compromise designs have been employed, such as, for example, co-acting rolls of different diameters; and one smooth roll of steel for its crushing action, co-acting with another smooth roll of rubber, for its enhanced gripping action. Crusher rolls made of various materials and with various surface tread patterns have also been employed in an effort to increase the aggressiveness of the crusher.

Crop and operating conditions, of course, vary the full ranges from thin growth versus thick (i.e., light versus heavy), large diameter stalks versus small diameter, tall crops versus short, hard stalks versus soft, presence of leaves versus absence, wet crops versus dry, and the like. With each of these variations the farmer/operator seeks to locate or identify the most acceptable balance between aggressiveness of feed and conditioner performance that will still give him an efficient and effective crop harvest.

It would be advantageous to provide a conditioner that exhibits the proper balance between aggressive feeding and conditioning for the crop types and conditions identified immediately above.

SUMMARY OF THE INVENTION

It is an object of the instant invention to provide an improved conditioner that will give aggressive feeding while maintaining an excellent crushing action to crop stalks.

It is another object of the instant invention to provide a pair of co-acting crop conditioning rolls having the aggressive feeding and stem cracking characteristics of a crimper while providing the full conditioning action of a crusher.

It is a further object of the instant invention to provide a pair of quiet running, relatively vibrationless co-acting crop conditioning rolls having an aggressive yet full conditioning action.

It is a still further object of the instant invention to provide a rugged, yet economical crop conditioning roll construction.

It is an even still further object of the instant invention to provide a crop conditioning roll design and construction that facilitates the economic manufacture of rolls.

It is a still further object of the instant invention to provide a crop conditioning roll design for a crop conditioner that reduces the drying time of the conditioned crops.

It is another object of this invention to provide a conditioner that may be installed on existing equipment as a retrofit, or installed on new equipment.

It is yet another object of this invention is to provide a crop conditioner that uses a grooved rubber/urethane roll on the bottom and a steel upper roll with spiral steel ribs that are timed to intermesh into the grooves of the lower roll.

It is a further object of this invention to provide a set of conditioning rolls that has unique characteristics to enhance feeding of the crop material when the rolls are abutted or set at precise gaps.

It is another object of this invention to provide a conditioning roll having a groove with a leading edge and a width that allows expansion of the crop material into the trialing gripper edges to provide gripping without abutting the adjacent roll.

It is another object of this invention to provide a grooved conditioning roll wherein the side of the groove is nearly perpendicular to the direction of crop travel for positive gripping and advancing the crop material through the conditioner.

It is a further object of this invention to provide a set of smooth crushing conditioning rolls wherein one roll has a set of ribs and the opposing roll has a set of grooves that intermesh with the ribs to enhance feeding.

It is a further object of this invention to provide a crop conditioner with a smooth steel roll with spiraled ribs fabricated to the outer surface thereof so as to intermesh with spiraled grooves of an opposing rubber/urethane roll.

It is a further object of this invention to provide a crop conditioner that is durable in construction, inexpensive to manufacture, carefree of maintenance, facile in assemblage, and simple and effective in use.

These and other objects are obtained by providing a pair of conditioning rolls that comprise one steel and one rubber/urethane roll. The steel roll has raised ribs formed thereon or attached thereto in a spiral configuration, while the rubber/urethane roll contains grooves therein that intermesh with the raised ribs during operation to grip the crop material. The smooth areas of the rolls crush the crop stems. Alternative embodiments of the grooves provide the ability to work within a wide range of crops, including crops that have heretofore proven difficult to condition.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
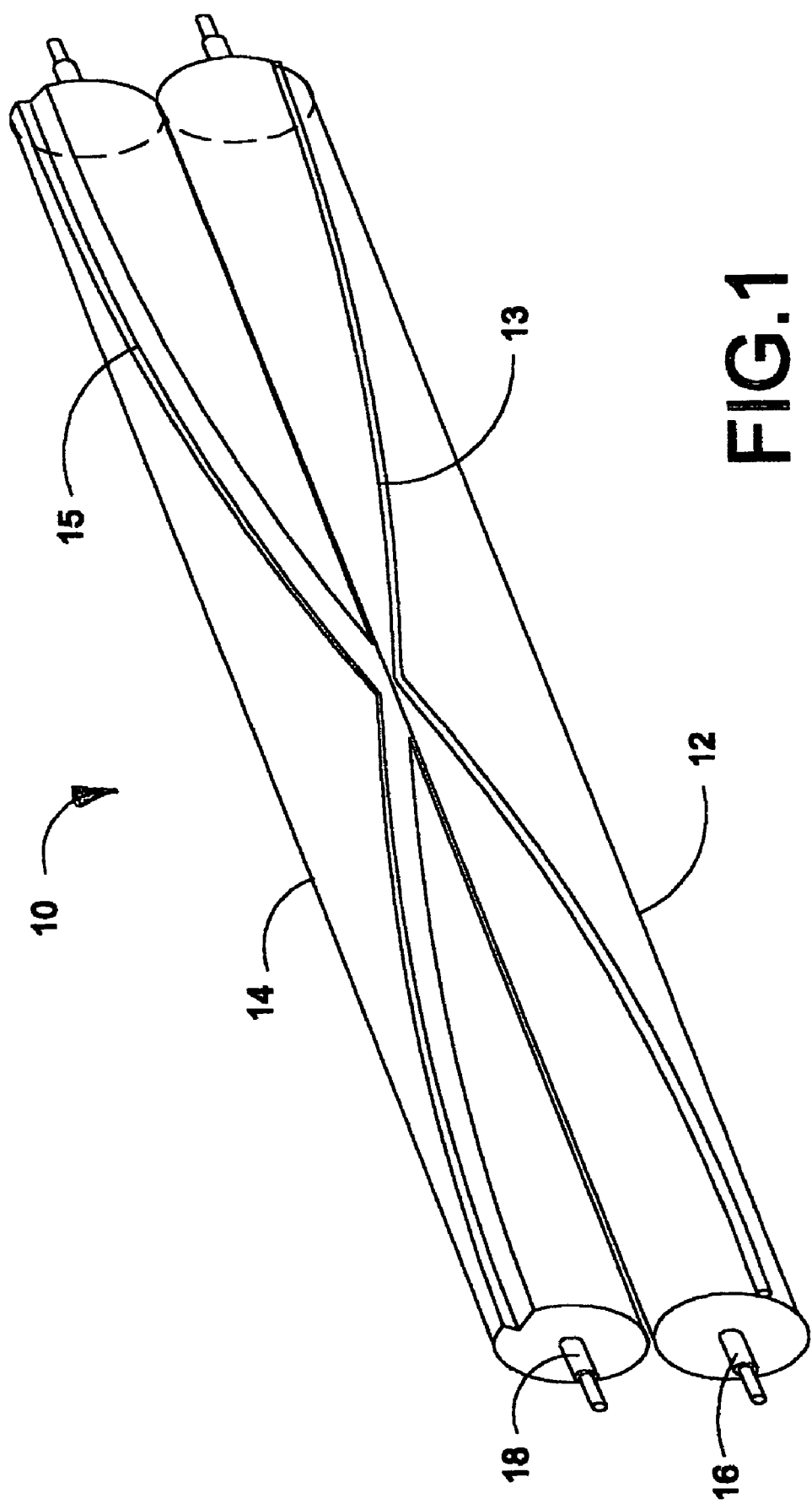
FIG. 1 is a front elevation perspective view of one embodiment of the two rolls of a conditioner incorporating the principles of the instant invention.

FIG. 1 shows a pair of conditioner rolls 10 in relative position generally as they would be in a crop conditioner. A steel ribbed roll 12 is shown intermeshing with a grooved rubber/urethane roll 14 (only one rib 13 and one groove 15 being depicted). Roll 14, which is preferably fixed in position, is securely attached to a framework (not shown) and rotates about fixed longitudinal axis corresponding to the axis of shaft 18. Roll 12, which is usually biased and movable toward roll 14, is movably mounted relative to the framework and is in approximate parallel alignment with roll 12. Movable roll 12, similarly to roll 14, rotates about the axis of shaft 16. Both rolls are generally cylindrical in shape and have end caps to enclose the interior and provide support for the rolls on the respective axises. As is known in the art, the movable roll 12 is biased toward the fixed roll 14 under a selectively variable pressure by springs or torsion bars, for example.

Urethane material of 80 Shore A durometer or higher is preferred for improved wear and toughness. Lower durometer material tends to be too soft, losing effective crushing in some crops and wearing too quickly. The grooves are preferably spiraled across the length of the roll for smooth operation. The spiral can be chevron as well as a single spiral.

Figure 2:
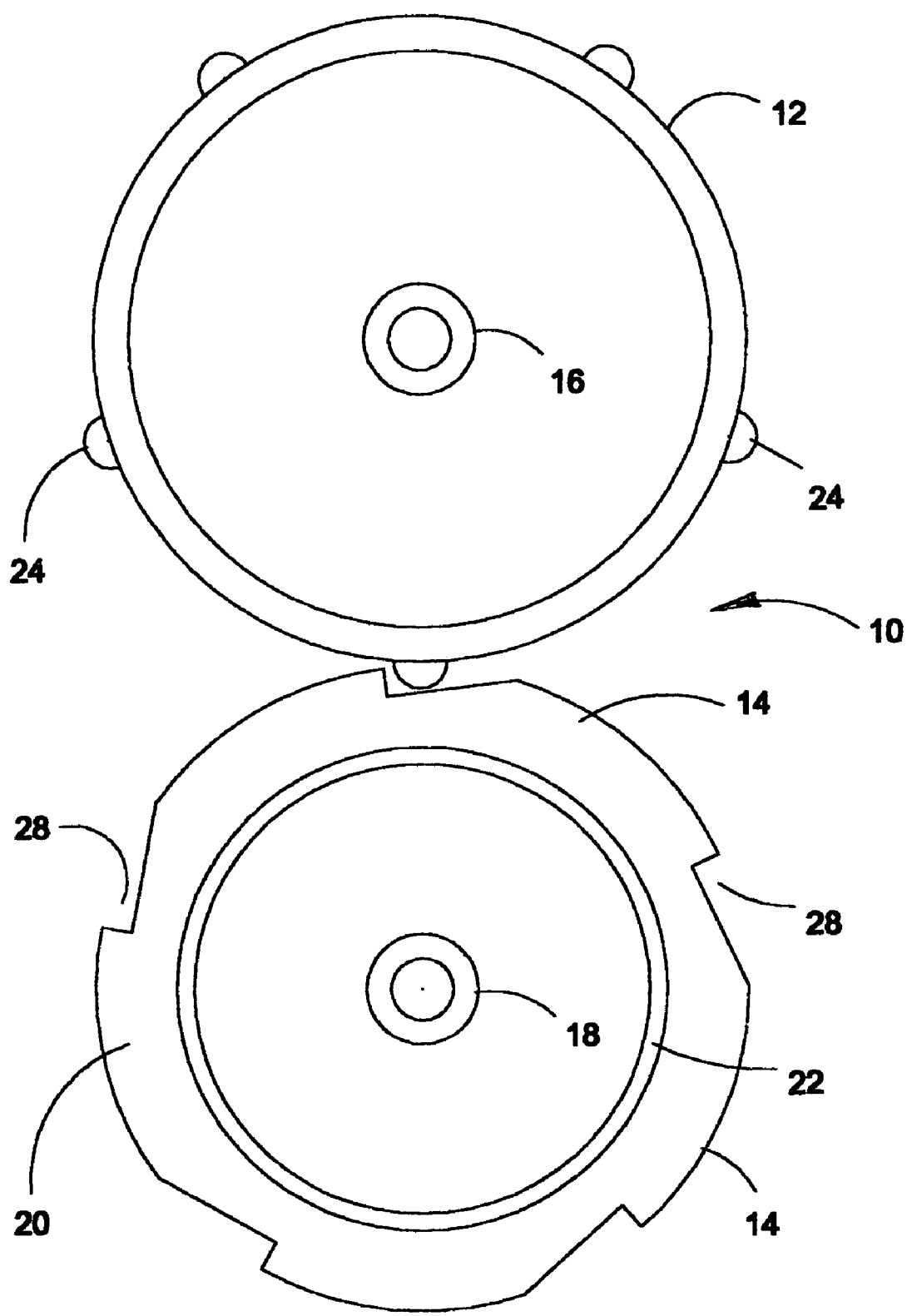
FIG. 2 is an end view of one embodiment of a two roller conditioner incorporating the principles of the instant invention.

FIG. 2 is an end view of one embodiment of the intermeshing rollers as contemplated by this invention. In this embodiment, steel ribbed roll 12 is mounted about shaft 16 and is intermeshing with rubber/urethane conditioning roll 14.

The grooves are either spiraled (right and left hand) or in a chevron pattern, similar to the pattern shown in FIG. 2 of U.S. Pat. No. 6,050,070. Two rolls are used, one generally above the other, and one of the two, either top or bottom, is made of steel. Roll 14, which contains the grooves, is made of rubber or urethane-like material 20 adhered to a tubular steel sleeve 22 by any of the processes well known in the art. Steel roll 12 has a raised rib 24 arranged to intermesh with the step grooves 28 on roller 14. The ribs 24 may in one form comprise a weld bead, however, it has been determined that a curved steel rod, welded to the smooth steel rolls is less expensive to manufacture and provides a more uniform and visually appealing rib. Furthermore, the rib could be fabricated out of a wear resistant material to improve durability. The two rolls are preferably run with a precision gap therebetween depending upon the specific crop conditions encountered. Five grooves and ribs have been found to be most generally effective, but this number may be anywhere in the range of 3–8 and provide acceptable results. The grooves and ribs are generally evenly spaced around the peripheral surface of the rollers. The gap between the two rolls can be changed to adjust intermeshing roll relationships for different crops.

Figure 3:
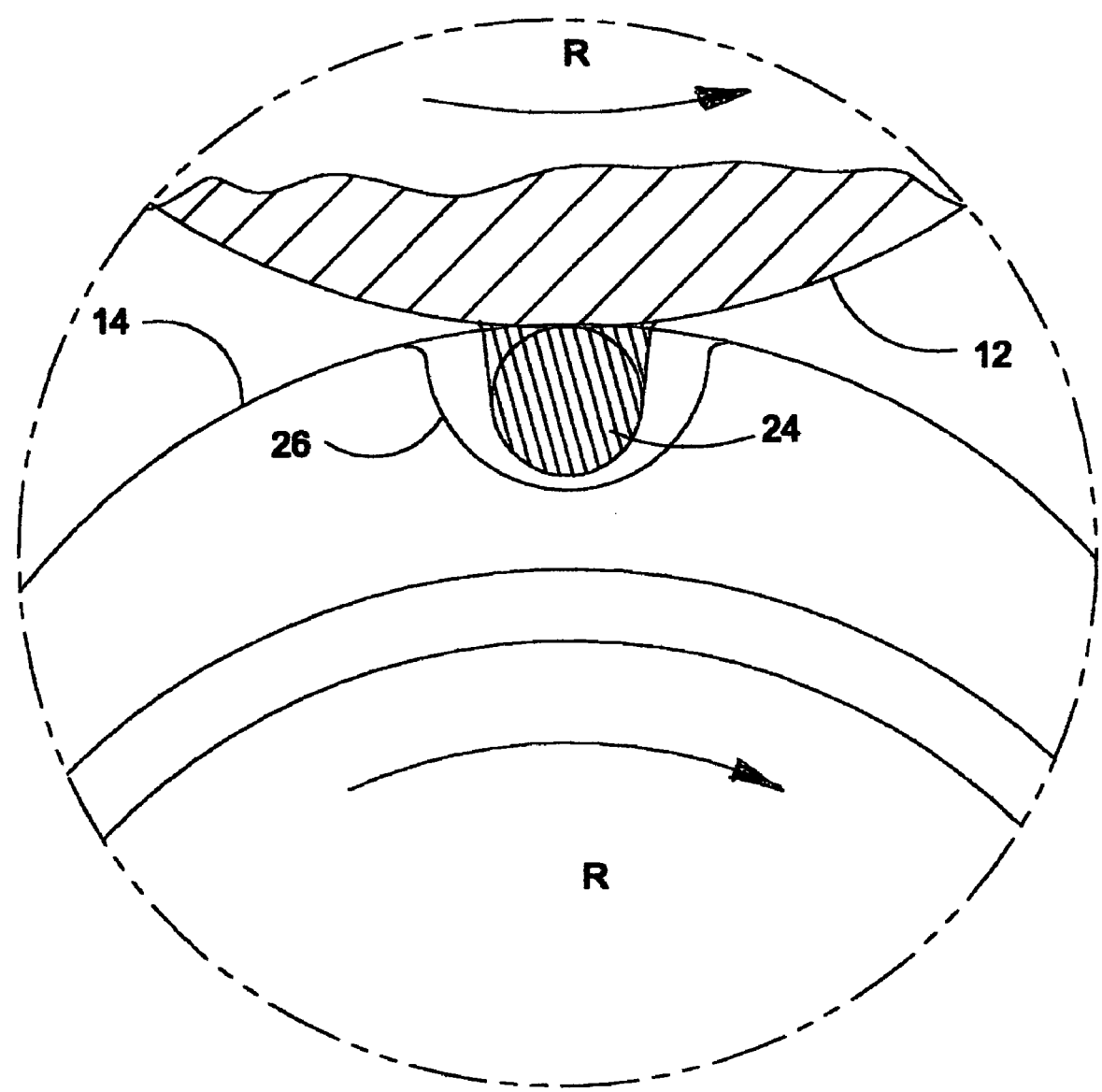
FIG. 3 is an enlarged partial cross sectional view of another embodiment of a two roller conditioner incorporating the principles of the instant invention to depict the intermeshing of the two rollers.

FIG. 3 is a cross sectional view of another embodiment of the grooved roller and clearly illustrates the most recent, effective, and preferred design of this roll combination which incorporates a semicircular groove 26 with rounded edges in the rubber/urethane roll 14. The rib 24 on the steel roll 12 is centered in the groove, but does not come into contact with the bottom of the groove. This minimum clearance between the bottom of the groove 26 and the tip of the rib 24 can vary, however it has been determined that minimally it should be about 30 thousandths of an inch, to prevent the complete breakage of the stems and excessive damage to the leaves of the crop material. The clearance then varies depending upon the exact shape of the groove—e.g., note the clearance around the rib 24 in FIGS. 3 and 4 with the different groove shapes 26 and 30. Generally, the clearance away from the top of the rib is 30 thousandths of an inch greater than the clearance at the top of the rib, e.g., if the clearance at the top of the groove is 30 thousandths, the remaining clearances is at least 60 thousandths. The grooves and ribs used in this design give a more positive feeding as the rolls rotate in the direction R, yet do not break the stalks or leaves into multiple pieces, while the smooth surfaces provide good conditioning. What these clearances do is provide a gripping of the crop material, while allowing the crop to slide and stretch within the groove without breaking.

Figure 4:
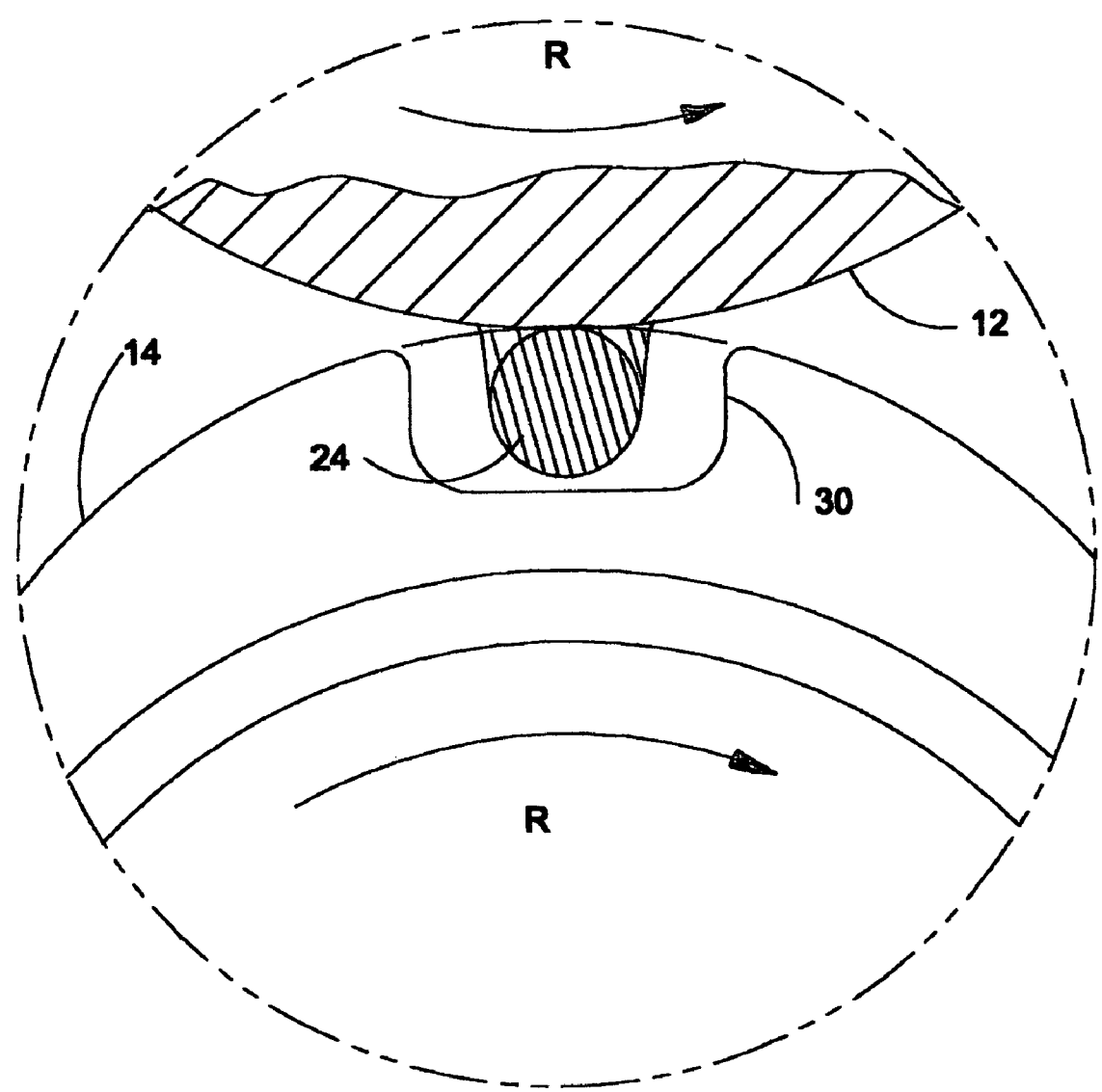
FIG. 4 is also an enlarged partial cross sectional view of yet another embodiment of a two roller conditioner showing a different groove configuration.

FIG. 4 is a cross-sectional view of yet another embodiment of the grooved roller. FIG. 4 depicts a design of this roll combination that incorporates a semi-rectangular groove 30 with rounded edges in the rubber/urethane roll 14. The rib 24 on the steel roll 12 is centered in the groove.

In operation, the ribs of the upper roll act as a feeding lug and press the crop material into the groove and against the gripper edge of the groove (the trailing edge in the direction of rotation R of the rolls) for positive feeding. This works well with rolls abutted for some crops, like alfalfa or grass, and with rolls precisely gapped for other crops, like cane. While the diameter of acceptable rolls can be within a wide range, a quite practical diameter has been between 9 and 10 inches. Likewise, the depth of the grooves and height of the ribs can vary considerably, with 5/16 inch to 7/16 inch in height being satisfactory for the rib.

These designs have been found particularly successful in oat hay. Oat hay stems have hard nodes along the length thereof that trap moisture between nodes. In order to break the stems adequately between nodes, what might be considered excessive conditioning in other crops must be used. Thus, it has been found that more pressure is required between the rolls—pressure provided in some machines made by New Holland with an optional heavier than usual torsion bar. The combination required for this invention has proven results in that it has almost halved the field drying time required in some circumstances.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A roll assembly for use on a crop conditioning machine comprising:
   first and second elongate rotatable rolls supported in a framework and disposed in adjacent parallel relationship, said first roll generally above said second roll;
   said first roll comprising an elongate cylindrical metallic body portion having a steel peripheral surface and at least one protruding metallic rib affixed to said steel peripheral surface, said rib being generally regular in cross-section and formed in a spiral along the length of said body portion, said rib is formed of a cylindrical rod of wear resistant metal welded to said peripheral surface;
   said second roll comprising an elongate cylindrical rigid body portion having a peripheral surface with a layer of hard elastomeric material affixed thereto, said elastomeric layer having at least one groove therein, said groove being formed in a spiral along the length of said rigid body portion and generally having a semi-circular cross-sectional configuration;
   said at least one groove has a side and a bottom, and said side being nearly perpendicular to the direction of crop travel; and
   said at least one rib and said at least one groove being arranged such that they intermesh as the rolls rotate in timed relationship such that the clearance between said at least one rib and said at least one groove is selectively adjustable with a minimum clearance between said at least one rib and said bottom of said at least on groove of 30 thousandths of an inch.

2. The assembly of claim 1, wherein:
   there is a minimum clearance between said peripheral surface of said second roll and said peripheral surface of said first roll of 60 thousandths of an inch.

3. The assembly of claim 2, wherein:
   said at least one rib and said at least one groove is an equal number of each in the range of 3 to 8; and
   said ribs and grooves are symmetrically and continuously arranged around the respective peripheral surfaces of first and second rolls.

4. The assembly of claim 3, wherein:
   said elastomeric material is urethane.

5. The assembly of claim 4, wherein:
   said elastomeric material comprises 80 Shore A durometer or higher.

6. The assembly of claim 1, wherein:
   said intermeshing ribs and grooves are in a spiral pattern along the length of said respective first and second rolls.

7. The assembly of claim 6, wherein:
   said at least one rib and said at least one groove is an equal number of each in the range of 3 to 8; and
   said ribs and grooves are symmetrically and continuously arranged around the respective peripheral surfaces of first and second rolls.

8. The assembly of claim 7, wherein:
   said elastomeric material is urethane.

9. The assembly of claim 8, wherein:
   said elastomeric material comprises 80 Shore A durometer or higher.

10. A roll assembly for use on a crop conditioning machine comprising:
    first and second elongate rotatable rolls supported in a framework and disposed in adjacent parallel relationship, said first roll generally above said second roll;
    said first roll comprising an elongate cylindrical metallic body portion having a peripheral steel surface and at least one protruding metallic rib affixed to said peripheral surface, said rib being generally regular in cross-section and formed in a spiral along the length of said peripheral steel surface;
    said second roll comprising an elongate cylindrical rigid body portion having a peripheral surface with a layer of hard elastomeric material affixed thereto, said elastomeric layer having at least one groove therein, said at least one groove being formed in a spiral along the length of said rigid body portion and generally having a generally U-shaped cross-sectional configuration with at least one groove side being generally perpendicular to the direction of crop travel said at least one groove having a bottom; and
    said at least one rib and said at least one groove being arranged such that they intermesh as the rolls rotate in timed relationship such that the clearance between said at least one rib and said at least one groove is selectively adjustable with a minimum clearance between said at least one rib and said bottom of said at least one groove of 30 thousandths of an inch.

* * * * *